(12) United States Patent
Nishizawa (10) Patent No.: US 8,089,528 B2
(45) Date of Patent: Jan. 3, 2012

(54) COLOR SIGNAL PROCESSING CIRCUIT, IMAGE PICKUP APPARATUS, AND COLOR SIGNAL PROCESSING METHOD

(75) Inventor: Yuka Nishizawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 355 days.

(21) Appl. No.: 12/254,398

(22) Filed: Oct. 20, 2008

(65) Prior Publication Data

US 2009/0102944 A1 Apr. 23, 2009

(30) Foreign Application Priority Data

Oct. 22, 2007 (JP) ................................ P2007-274494

(51) Int. Cl.
*H04N 9/73* (2006.01)
(52) U.S. Cl. ..................................................... 348/223.1
(58) Field of Classification Search ............... 348/223.1, 348/224.1, 225.1
See application file for complete search history.

(56) References Cited

U.S. PATENT DOCUMENTS

| | | | |
|---|---|---|---|
| 6,642,957 B1 | 11/2003 | Taura | |
| 2004/0263642 A1* | 12/2004 | Fuyuki | 348/222.1 |
| 2005/0286097 A1* | 12/2005 | Hung et al. | 358/509 |
| 2006/0176379 A1* | 8/2006 | Hyodo | 348/223.1 |
| 2008/0101690 A1* | 5/2008 | Hsu et al. | 382/162 |
| 2008/0252749 A1* | 10/2008 | Fujiwara | 348/224.1 |

FOREIGN PATENT DOCUMENTS

| | | |
|---|---|---|
| JP | 1 231586 | 9/1989 |
| JP | 2751297 | 2/1998 |
| JP | 11 136696 | 5/1999 |
| JP | 11 331854 | 11/1999 |
| JP | 2000 209598 | 7/2000 |
| JP | 2005 303785 | 10/2005 |
| JP | 2006 217169 | 8/2006 |
| JP | 2007 74299 | 3/2007 |

* cited by examiner

*Primary Examiner* — Jason Whipkey
(74) *Attorney, Agent, or Firm* — Frommer Lawrence & Haug LLP; William S. Frommer; Thomas F. Presson (57) ABSTRACT

The color signal processing circuit includes a first calculation unit generating an R/G value, a second calculation unit generating a B/G value, and a position specifying unit specifying, based on the R/G and B/G values, a position expressed as a color temperature of the light of a light source in a color coordinate system defined by R/G and B/G coordinate axes as the position of the light source. The color signal processing circuit further includes a pull determining unit determining a displacement amount between the light source position specified and a position of a target point on a blackbody radiation curve defined in the color coordinate system, sets gain values for the R, G, B color signals for achieving a white balance based on the displacement amount, and supplies the gain values to white balance amps amplifying the R, G, B color signals, and carries out white balance processing.

4 Claims, 5 Drawing Sheets

COLOR SIGNAL PROCESSING CIRCUIT, IMAGE PICKUP APPARATUS, AND COLOR SIGNAL PROCESSING METHOD

CROSS REFERENCES TO RELATED APPLICATIONS

The present invention contains subject matter related to Japanese Patent Application JP 2007-274494 filed in the Japanese Patent Office on Oct. 22, 2007, the entire contents of which being incorporated herein by reference.

BACKGROUND OF THE INVENTION

1. Field of the Invention

The present invention relates to a color signal processing circuit, an image pickup apparatus, and a color signal processing method that can be favorably applied to adjusting white balance by adjusting the gain of primary color signals of red (R), green (G), and blue (B) (hereinafter referred to as R, G, B color signals) generated by an image pickup element irradiated with light that is incident from a light source via an optical system.

2. Description of the Related Art

In the past, digital still cameras, digital video cameras and the like have been provided as examples of image pickup apparatuses that automatically carry out white balance processing. Here, the term "white balance processing" refers to processing that changes respective gains of the R, G, B color signals obtained from a camera system so that the signals all become equal when picking up an image of a white subject that is illuminated by a given light source.

By carrying out white balance processing, an image pickup apparatus adjusts white color that look colored due to differences between various light sources such as natural light (i.e., sunlight), light from incandescent bulbs, or light from fluorescent bulbs (for example, when the color temperature of a light source is low, the white color looks reddish and when the color temperature of the light source is high, the white color looks bluish) so as to become achromatic white. Processing that automatically adjusts white balance using a blackbody radiation curve showing changes in color temperature of natural light is called "automatic white balance processing".

However, it is difficult to precisely and universally express a blackbody radiation curve (expressing changes in color temperature as a curve) using an equation. For this reason in the past, white balance has been adjusted by "pulling" the color temperature of a light source to a target value using a rectangular pull frame or by using a blackbody radiation curve that is substantially linearly-approximated.

Figure 1:
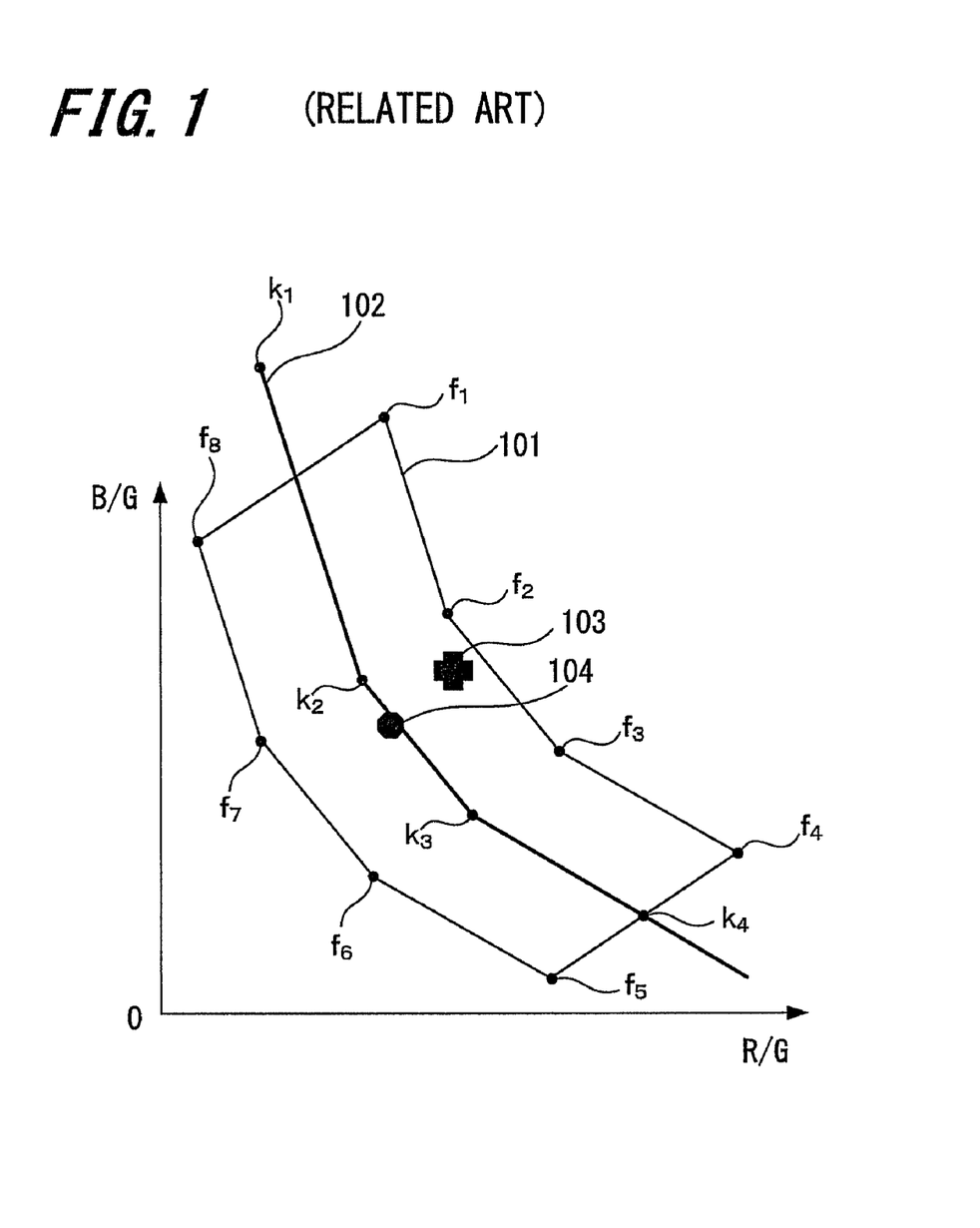
FIG. 1 is a diagram showing an example of a pull frame used in existing automatic white balance processing.

An example of a pull frame set by existing white balance processing will now be described with reference to FIG. 1. FIG. 1 is a diagram showing one example of a pull frame and a linear approximation of a blackbody radiation curve in a color coordinate system where the vertical axis represents B/G and the horizontal axis represents R/G. The pull frame 101 is an octagon composed of the eight approximate points $f_1$ to $f_8$. A blackbody radiation curve 102 is a broken line that is linearly approximated using approximate points $k_1$ to $k_4$. The blackbody radiation curve 102 is positioned inside the pull frame 101 and the slope of the pull frame 101 is set in accordance with the slope of the blackbody radiation curve 102.

According to the existing method, when automatically adjusting white balance, the color temperature of the surrounding environment (i.e., light source) is obtained to find the present point 103 expressing the position of the light source in a color coordinate system. When the present point 103 is positioned inside the pull frame 101, the present point 103 is pulled toward a convergence target point 104 set on the blackbody radiation curve 102. By pulling the present point 103 in this way, the white balance is adjusted.

Japanese Unexamined Patent Application Publication No. H11-331854 Patent Document 1 discloses a camera system that adjusts white balance, when integrated value data obtained by integrating a color difference signal in each field is present inside a pull limit frame set based on a reference point, by moving the reference point along a blackbody radiation curve in a direction that is asymmetric about the origin of a color coordinate system.

SUMMARY OF THE INVENTION

However, as shown in FIG. 1, since the blackbody radiation curve 102 is merely a linear approximation of a real blackbody radiation curve with four points, the white balance has not been always very precise. When the precision of the white balance is low, a different color temperature will be determined to the color temperature of the actual light source, and a low-precision convergence target point that differs from the real target point will be set. As a result, even when filming outside during the day and during the evening, convergence to the same convergence target point 104 will be carried out. This means that even when filming during the evening, for example, it is difficult to achieve suitable evening tones in the filmed images.

When carrying out a pull, for example processing that moves the present point parallel to the R direction to converge on the blackbody radiation curve 102 has also been carried out, but this has resulted in the pulled color temperature looking unnatural. Regarding filming during the evening, for example, human vision has a characteristic that changes in color temperature are tolerated for changes in blue but even small changes in red are not tolerated. Since existing pull processing has not taken this characteristic of human vision into account, highly precise white balance processing has not been possible.

The present invention was conceived in view of the problem described above and provides improvement in the precision of white balance processing.

According to an embodiment of the present invention, a color signal processing circuit generates a first divided value by dividing a first primary color signal of a plurality of primary color signals generated by an image pickup element irradiated with light from a light source via an optical system by a second primary color signal of the plurality of primary color signals, generates a second divided value by dividing a third primary signal of the plurality of primary color signals by the second primary signal, and specifies a position of the light source based on the first and second divided values, with a position that expresses a color temperature of light of the light source in a color coordinate system determined by a first coordinate axis expressed by dividing the first primary color signal by the second primary color signal and a second coordinate axis expressed by dividing the third primary color signal by the second primary color signal as the position of the light source. The color signal processing circuit then determines a displacement amount between the position of the light source and a position of a target point on a blackbody radiation curve defined in the color coordinate system, sets gain values for the first to third primary colors for adjusting a white balance based on the displacement amount, and supplies the gain values to primary color signal amplifying units that amplify the first to third primary color signals.

By operating the color signal processing circuit as described above, it is possible to carry out high-precision white balance processing in accordance with the image pickup environment (i.e., the color temperature of the light from the light source).

According to an embodiment of the present invention, by adjusting the white balance so as to reflect the color temperature of the light source, it is possible to achieve a natural color temperature in accordance with the image pickup environment (i.e., the color temperature of the light source). As a result, there is the effect that even if the image pickup environment changes, it will still be possible to pick up images without a color temperature that looks unnatural.

DESCRIPTION OF THE PREFERRED EMBODIMENTS

Preferred embodiments of the present invention will now be described with reference to FIGS. 2 to 5. A color signal processing circuit 1 that adjusts the gains of R, G, B color signals according to an embodiment of the present embodiment is adapted to an image pickup apparatus 10 that carries out white balance processing. In the present embodiment, based on a blackbody radiation curve that is approximated on a predetermined color coordinate system and isochromatic color temperature curves that are determined in accordance with the blackbody radiation curve, a position that represents the color temperature of a light source is pulled to carry out white balance processing that adjusts the gains of R, G, B color signals. In the present embodiment, for color temperature in a still or video image, a process that changes the gains of R, G, B color signals, used in white balance processing, so that a position that represents the color temperature of light from a light source, which is determined in a predetermined color coordinate system (hereinafter, such position is simply referred to as the "light source position"), converges on a desired color temperature is referred to as a "pull". When a pull that makes the color temperature in a still or video image converge to a desired color temperature is carried out, the displacement amount for making the light source position match the position of a target point on a blackbody radiation curve, representing the desired color temperature, is determined. Based on the obtained displacement amount, the gain values of the R, G, B color signals are set, and thereby adjusting the white balance is carried out for the light source. Although the color signal processing circuit 1 described in the present embodiment is installed in an image pickup apparatus such as a digital still camera, the color signal processing circuit 1 can also be applied to an image pickup apparatus such as a camera installed in a mobile telephone, a video camera, or the like.

Figure 2:
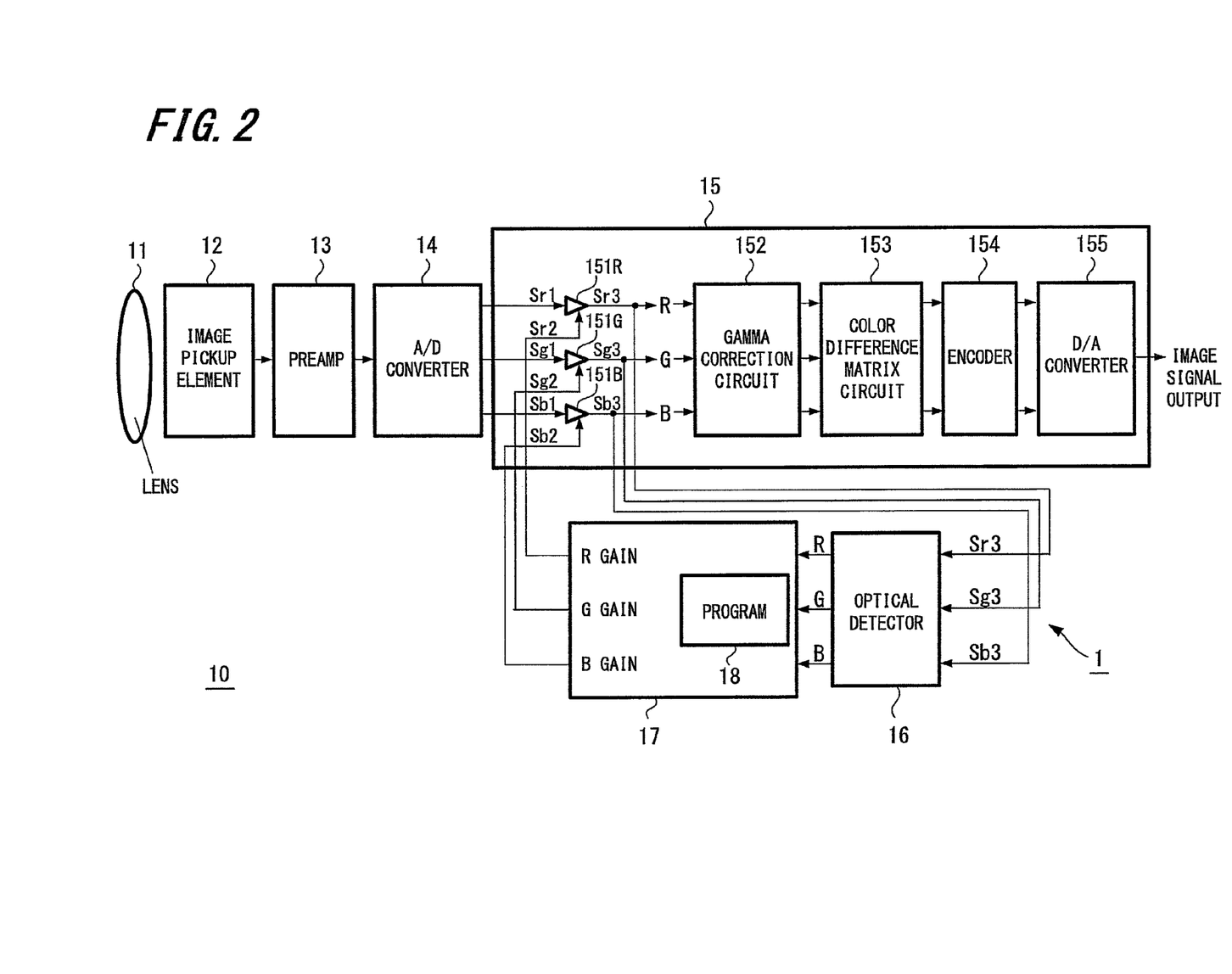
FIG. 2 is a block diagram showing an exemplary internal construction of an image pickup apparatus according to an embodiment of the present invention.

First, one example of the internal construction of the image pickup apparatus 10 will be described with reference to FIG. 2. The image pickup apparatus 10 includes a lens 11 that focuses light rays, an image pickup element 12 that converts the light rays focused by the lens 11 to a signal voltage, a preamp 13 that amplifies the signal voltage, and an A/D converter 14 that converts an analog image signal to a digital image signal. The image pickup apparatus 10 further includes a digital signal processing circuit 15 that carries out predetermined processing on the digital image signal, an optical detector 16 that integrates the digital image signal in each field, and a system controller 17 that carries out predetermined calculation processing on the integrated digital image signal and, after carrying out a "pull determination" described later, supplies adjusted R, G, B gain signals to the digital signal processing circuit 15. Note that the lens 11 is an optical system attached to a lens barrel, not shown, and such lens barrel can be detached from the image pickup apparatus. The digital signal processing circuit 15, the optical detector 16, and the system controller 17 are collectively referred to as the "color signal processing circuit 1".

In the image pickup apparatus 10, an image of an irradiated subject (not shown) via the lens 11 is formed on an image pickup surface of the image pickup element 12. The image pickup element 12 generates R, G, B color signals based on the light incident from the light source via the lens 11. As the image pickup element 12, a solid-state image pickup element such as a CCD (Charge-Coupled Device) is used. The image pickup element 12 converts the image formed on the image pickup surface into electric signals and supplies such signals as image signals (i.e., R, G, B color signals) to the preamp 13.

The preamp 13 fetches required data by sampling and holding the image signals outputted from the image pickup element 12 and carries out gain control to adjust the signals to an appropriate level. The output signals of the preamp 13 are supplied to the A/D converter 14. The A/D converter 14 converts the output signals of the preamp 13 from analog R, G, B color signals to digital R, G, B color signals. The A/D converter 14 supplies the digital R, G, B color signals to white balance amps 151R, 151G, 151B that adjust the respective gains of the color signals.

The digital signal processing circuit 15 includes the white balance amps 151R, 151G, 151B that adjust respective gains of R, G, B color signals, a gamma correction circuit 152 that carries out gamma correction of R, G, B color signals whose gains have been adjusted, a color difference matrix circuit 153 that carries out color difference matrix processing on R, G, B color signals, an encoder 154 that carries out encoding to convert R, G, B color signals to predetermined signals, and a D/A converter 155 that converts the digital image signals to analog image signals. Note that it is possible to use a construction where the A/D converter 14 is provided inside the digital signal processing circuit 15. It is also possible to use a construction where the D/A converter 155 is provided outside the digital signal processing circuit 15.

The white balance amp 151R adjusts the gain of an R signal Sr1 supplied from the A/D converter 14 based on an R gain signal Sr2 provided from the system controller 17. The R signal Sr1 whose gain has been adjusted is supplied to the gamma correction circuit 152 as an R signal Sr3. The white balance amp 151G adjusts the gain of a G signal Sg1 supplied from the A/D converter 14 based on a G gain signal Sg2 provided from the system controller 17. The G signal Sg1 whose gain has been adjusted is supplied to the gamma correction circuit 152 as a G signal Sg3. The white balance amp 151B adjusts the gain of a B signal Sb1 supplied from the A/D converter 14 based on a B gain signal Sb2 provided from the system controller 17. The B signal Sb1 whose gain has been adjusted is supplied to the gamma correction circuit 152 as a B signal Sb3.

That is, the white balance amps 151R, 151G, and 151B adjust respective gains of R, G, B color signals based on the R gain signal Sr2, the G gain signal Sg2, and the B gain signal Sb2, provided from the system controller 17, so that the ratios between the R signal Sr1, the G signal Sg1, and the B signal Sb1 become equal. In this way, white balance processing is carried out.

The gamma correction circuit 152 carries out gamma (γ) correction to achieve faithful color reproduction based on the R signal Sr3, the G signal Sg3, and the B signal Sb3, supplied from the white balance amps 151R, 151G, and 151B, respectively. After this, color difference matrix processing is carried out by the color difference matrix circuit 153, and the signals are combined with a luminance (Y) signal, not shown, by the encoder 154 to convert the signals to image signals. Next, the D/A converter 155 converts the image signals from digital signals to analog signals. The R signal Sr3, the G signal Sg3, and the B signal Sb3 that have passed the white balance amps 151R, 151G, and 151B are also supplied to the optical detector 16. The optical detector 16 integrates and detects signals of a specified signal level inside a specified field for each of the R signal Sr3, the G signal Sg3, and the B signal Sb3.

Figure 3:
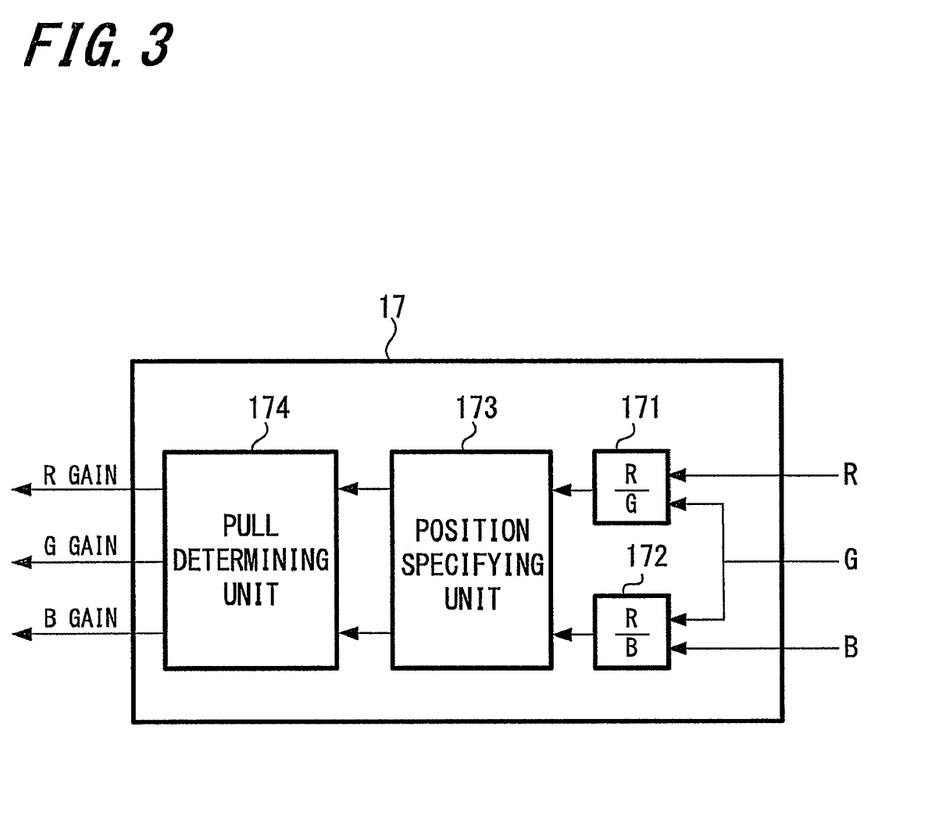
FIG. 3 is a block diagram showing an example construction of a system controller of the image pickup apparatus according to an embodiment of the present invention.

Next, one example of the functioning of the system controller 17 will be described with reference to FIG. 3. The system controller 17 that is supplied with integrated value data for each of the R, G, B color signals from the optical detector 16 is constructed of a microcomputer, for example.

The system controller 17 includes a first calculation unit 171 that divides the R color signal by the G color signal to generate a divided value R/G, a second calculation unit 172 that divides the B color signal by the G color signal to generate a divided value B/G, and a position specifying unit 173 that specifies the light source position determined by the divided values (R/G, B/G) in a color coordinate system that has an R/G axis and a B/G axe as the coordinate axes. The system controller 17 further includes a pull determining unit 174 that pulls the specified light source position to a target position on a blackbody radiation curve defined in this color coordinate system and generates R, G, B gain signals based on the displacement amount between the specified light source position and the target position.

The pull determining unit 174 carries out a "pull determination" based on a blackbody radiation curve and isochromatic color temperature curves (see FIG. 5) in the (R/G, B/G) coordinate system as described later. When doing so, it is determined whether the light source position specified by the position specifying unit 173 is inside a range defined by a right isochromatic color temperature curve 42 and a left isochromatic color temperature curve 43 shown in FIG. 5 and described later, and when the light source position is inside range, the light source position is pulled toward a predetermined target point on the blackbody radiation curve. Then, the pull determining unit 174 generates the R gain signal Sr2, the G gain signal Sg2, and the B gain signal Sb2 that are required to adjust the white balance.

The system controller 17 is configured such that a calculation processing unit such as a CPU (Central Processing Unit) installed in the image pickup apparatus 10 carries out processing by executing a software program stored in a memory. Specifically, the system controller 17 achieves the functions of the first calculation unit 171, the second calculation unit 172, the position specifying unit 173, and the pull determining unit 174 achieved by software, for example. A program 18 for realizing such functions is stored in the memory provided in the system controller 17 and is sequentially read out and executed. An update program can be written into the program 18 via a communication module, not shown, provided in the image pickup apparatus 10 so that functions can be added.

In this way, in the system controller 17, the integrated value data produced by integrating each of the R, G, B color signals supplied from the optical detector 16 is converted to R/G, B/G data by a dividing process. Since the system controller 17 can convert the data by simple calculation processing, the load of software can be reduced.

Note that in the present embodiment, the case where the calculation of R/G and B/G data is carried out by software according to the program 18 inside the system controller 17 is described. However, the first calculation unit 171, the second calculation unit 172, the position specifying unit 173, and the pull determining unit 174 that correspond to the various functional modules of the system controller 17 can also be constructed by hardware. When such components are constructed by hardware, it is possible to improve the calculation processing speed.

The R gain signal Sr2, the G gain signal Sg2, and the B gain signal Sb2 generated by the system controller 17 are fed back to the white balance amps 151R, 151G, and 151B (see FIG. 2) inside the digital signal processing circuit 15 described earlier. The system controller 17 controls the respective gains of the white balance amps 151R, 151G, and 151B using such fed back gain signals.

In such control, when adjusting the white balance based on the R/G and B/G data, the system controller 17 adjusts the color temperature of an image to be converged using isochromatic temperature lines calculated based on a blackbody radiation curve.

Here, examples of an xy chromaticity diagram and an uv chromaticity diagram in which the blackbody radiation curve is expressed will now be described with reference to FIGS. 4A and 4B.

First, an example of an xy chromaticity diagram will be described with reference to FIG. 4A. Note that the xy chromaticity diagram shown in FIG. 4A is an added version of a drawing taken from a known publication (Noboru Ohta, "IRO SAIGEN KOUGAKU NO KISO" ("Fundamentals of Color Reproduction Technology"), Corona Publishing Co. Ltd., p 18). In the length direction of the blackbody radiation curve 21 shown in the xy chromaticity diagram, a plurality of isochromatic temperature lines with different slopes are shown for predetermined color temperature. The isochromatic temperature lines are shown in a range of 1515K to infinity. The deviation from the blackbody radiation curve 21 is referred to as the "deviation Δuv", and in the width direction of the blackbody radiation curve 21, equal deviation lines (not shown) with different rates of curvature for each deviation Δuv are obtained.

A high color temperature region 22 where the color temperature is high is present at the lower left of the xy chromaticity diagram. The high color temperature region 22 is a region where the color temperature is around 10,000K or higher. In the same way, a low color temperature region 23 where the color temperature is low is present at the upper right of the xy chromaticity diagram. The low color temperature region 23 is a region where the color temperature is around 2,500K to 3,000K.

Even if the color temperature of the light source is not positioned on the blackbody radiation curve 21, if it is positioned inside the range of ±0.02 uv equal deviation lines, it can normally be said that the light source has the same color temperature as a color temperature on an isochromatic temperature line. For example, a color temperature 24a that is positioned on an isochromatic temperature line 24 of 2500K and is also positioned on the blackbody radiation curve 21 can be said to be a color temperature of 2500K. Also, a color temperature 24b that is positioned on the isochromatic color temperature line 24 of 2500K but is not positioned on the blackbody radiation curve 21 can also be said to be a color temperature of 2500K. On the other hand, a color temperature 24c that is not positioned on the isochromatic color temperature line 24 of 2500K and is not positioned on the blackbody radiation curve 21 cannot be said to be a color temperature of 2500K.

In this way, by using the blackbody radiation curve 21 as a reference, if the color temperature of a light source is positioned inside a range of a predetermined deviation width, the color temperature of the light source can be obtained.

Next, one example of a uv chromaticity diagram will be described with reference to FIG. 4B. The uv chromaticity diagram is expressed by converting the coordinates of the xy chromaticity diagram using a predetermined equation. The uv chromaticity diagram expressed in this way is shown as a CIE1960uv chromaticity diagram, for example (in the following description, this is abbreviated to "uv chromaticity diagram"). When the coordinates are converted from the xy chromaticity diagram to the uv chromaticity diagram, the chromaticities u, v are calculated using the following Equation (1). X, Y, Z are tristimulus values.

$$u = \frac{4x}{-2x + 12y + 3} = \frac{4X}{X + 15Y + 3Z} \quad \text{Equation (1)}$$
$$v = \frac{6y}{-2x + 12y + 3} = \frac{6Y}{X + 15Y + 3Z}$$

Compared to an xy chromaticity diagram, the converted uv chromaticity diagram has a characteristic that the difference in colors between two points in the chromaticity diagram somewhat matches the sensuous difference in color.

The result of converting the coordinates of the blackbody radiation curve 21 expressed on the xy chromaticity diagram is expressed as a blackbody radiation curve 31 in the uv chromaticity diagram. In the length direction of the blackbody radiation curve 31, a plurality of isochromatic temperature lines with different slopes are shown for predetermined color temperatures. The isochromatic temperature lines are shown in a range of 2000K to 15000K. The color temperature of the light source is given according to such isochromatic temperature lines.

The first calculation unit 171 and the second calculation unit 172 calculate the values of the chromaticities x, y according to Equation (1). Then, tristimulus values X, Y, Z are calculated from the calculated chromaticities x, y using Equation (2) below.

$$x = \frac{X}{X+Y+Z} \quad \text{Equation (2)}$$
$$y = \frac{Y}{X+Y+Z}$$
where
$$X + Y + Z = 1$$

Further, the first calculation unit 171 and the second calculation unit 172 calculate the values of R, G, B color signals from the calculated tristimulus values X, Y, Z using Equation (3) below.

$$\begin{pmatrix} R \\ G \\ B \end{pmatrix} = \begin{pmatrix} 2.7689 & 1.7517 & 1.1302 \\ 1.0000 & 4.5907 & 0.0601 \\ 0.0000 & 0.0565 & 5.5943 \end{pmatrix}^{-1} \begin{pmatrix} X \\ Y \\ Z \end{pmatrix} \quad \text{Equation (3)}$$

Based on the calculated values of R, G, B color signals, the first calculation unit 171 and the second calculation unit 172 respectively calculate the divided value R/G and the diviced value B/G. Based on the calculated R/G and B/G values, the position specifying unit 173 specifies the light source position in a color coordinate system where R/G and B/G are set as the coordinate axes.

Figure 5:
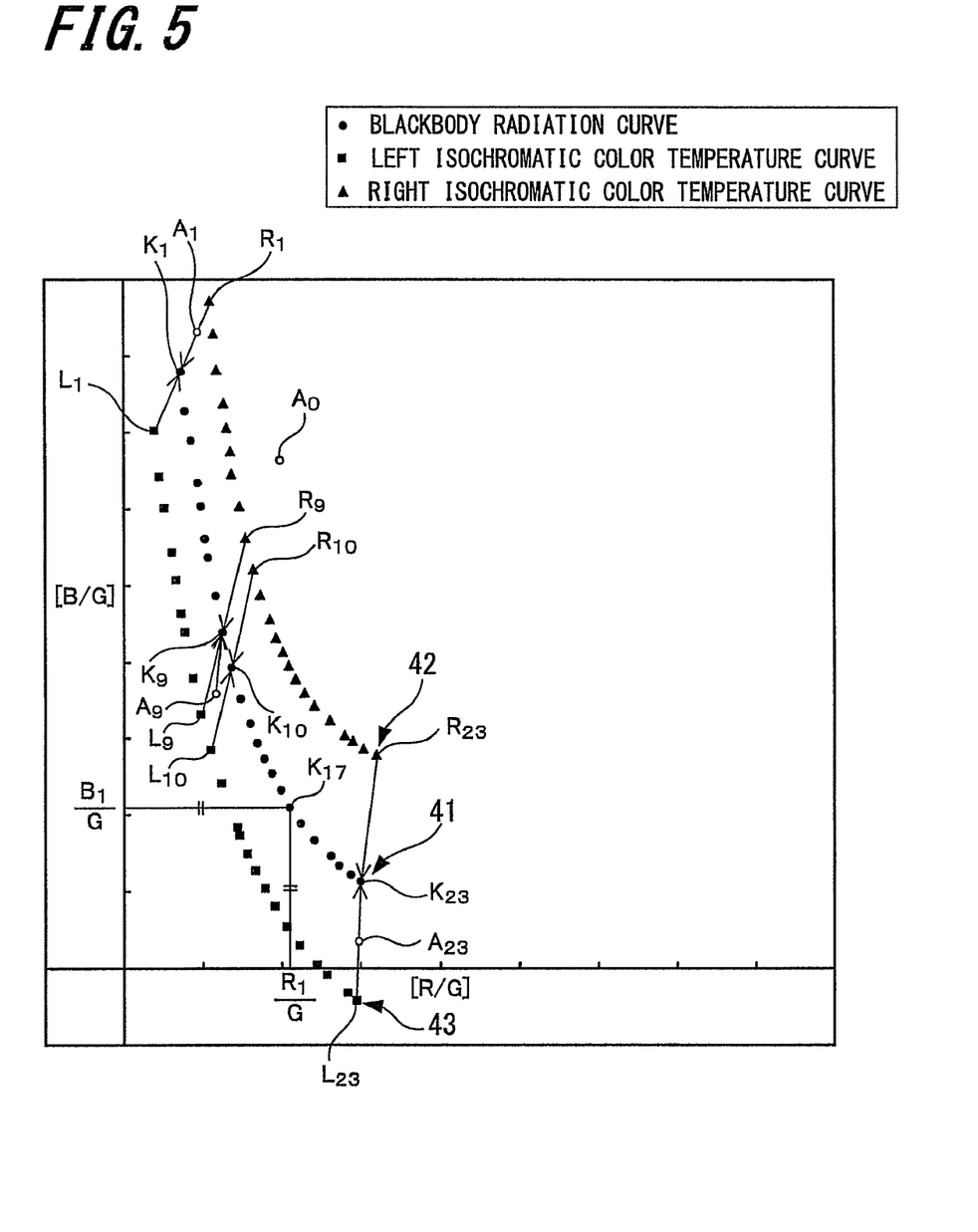
FIG. 5 is a diagram showing examples of a blackbody radiation curve and isochromatic color temperature curves according to an embodiment of the present invention.

Next, examples of a blackbody radiation curve and isochromatic color temperature curves in a coordinate system that has R/G as the horizontal axis and B/G as the vertical axis will be described with reference to FIG. 5. The intersection between the R/G axis and the B/G axis is the origin. In FIG. 5, a blackbody radiation curve 41 shows the result of a matrix conversion carried out on the blackbody radiation curve 31 in the uv chromaticity diagram. A right isochromatic color temperature curve 42 and a left isochromatic color temperature curve 43 each with a deviation width corresponding to the blackbody radiation curve 41 are then set. The curves 41, 42, 43 are each composed of 23 approximate points.

The blackbody radiation curve 41, the right isochromatic color temperature curve 42, and the left isochromatic color temperature curve 43 are produced by a matrix conversion of the blackbody radiation curve 31 defined on the uv axes in the uv chromaticity diagram to R/G and B/G axes. The matrix conversion is carried out using Equation (3) given above or the like. The right isochromatic color temperature curve 42 corresponds to an equal deviation line of +0.02uv in the xy chromaticity diagram (see FIG. 4A) and the left isochromatic color temperature curve 43 corresponds to an equal deviation line of −0.02uv in the xy chromaticity diagram (see FIG. 4A).

During the matrix conversion, approximate points are extracted using mired steps that are visually equally-spaced units. As the mired steps, 23 approximate points at 20 mired intervals are selected in a predetermined range on the blackbody radiation curve. Here, 20 mired intervals are used since it is said that the latitude in color temperature for color film is ±10 mireds. In this way, in a range where the color temperature is 2300K to 20000K, the blackbody radiation curve 41 is approximated using 22 broken lines shown using 23 approximate points. Note that the broken lines are not shown in FIG. 5.

Figure 4A:
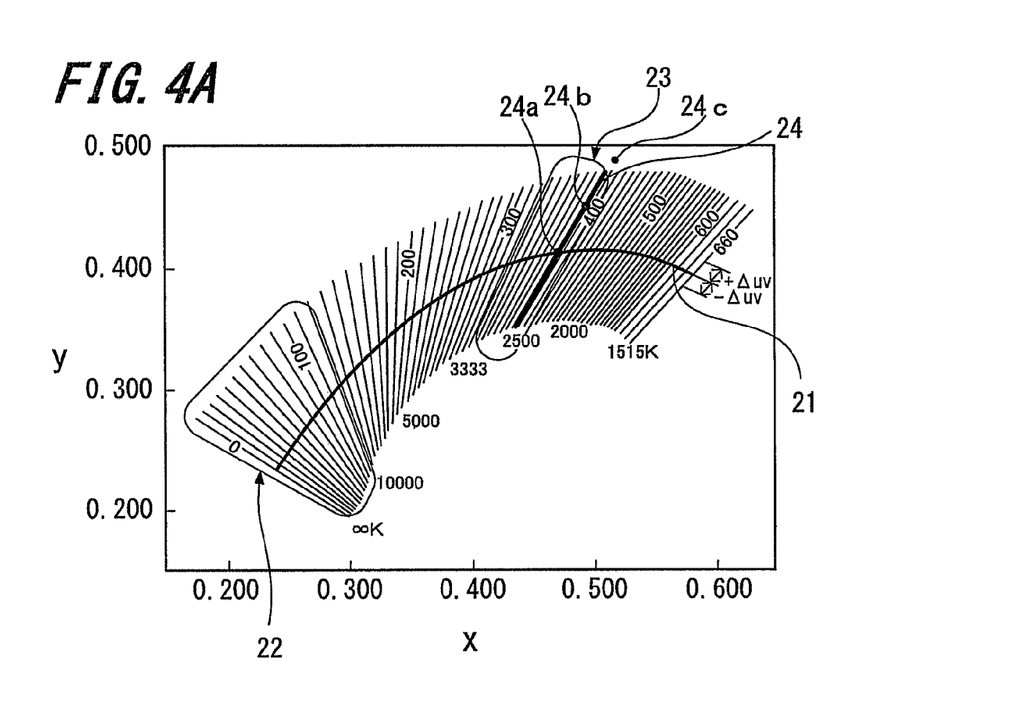
FIGS. 4A and 4B are diagrams showing examples of an xy chromaticity diagram and a uv chromaticity diagram according to an embodiment of the present invention.
Figure 4B:
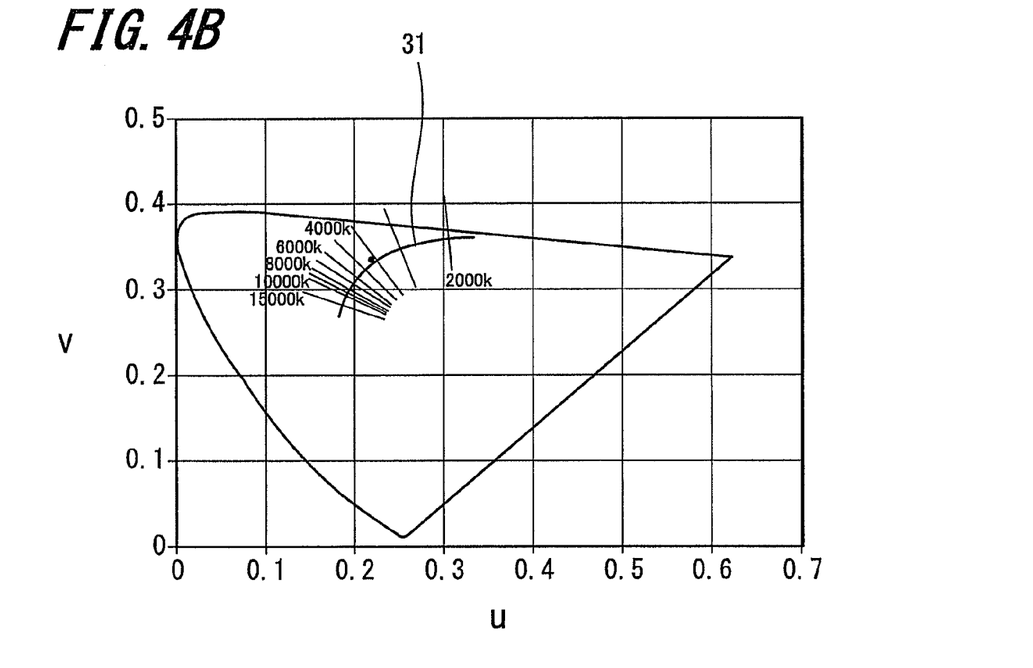

The approximate points of the right isochromatic color temperature curve 42 and the left isochromatic color temperature curve 43 that correspond to the points of the blackbody radiation curve 41 are calculated based on uv isochromatic color temperatures after conversion of the deviation widths shown in the xy chromaticity diagram in FIG. 4A to the uv chromaticity diagram. The calculated approximate points are defined as array elements. The right isochromatic color temperature curve 42 and the left isochromatic color temperature curve 43 are respectively expressed by 22 broken lines shown by 23 approximate points in the same way as the blackbody radiation curve 41.

For example, the blackbody radiation curve 41 is constructed of 23 approximate points composed of approximate points $K_1$ to $K_{23}$ in FIG. 5. The coordinates of the approximate points $K_1$ to $K_{23}$ are stored in the array K[1] to K[23]. The approximate points $K_1$ to $K_{23}$ correspond to target values in a pull process carried out when adjusting the white balance. In the pull process, the present color temperature is pulled toward a target value. In the present embodiment, the target value is set at one point out of the approximate points $K_1$ to $K_{23}$ and such point is referred to as the "convergence target point".

The right isochromatic color temperature curve 42 is constructed of 23 approximate points composed of the approximate points $R_1$ to $R_{23}$. The coordinates of the approximate points $R_1$ to $R_{23}$ are stored in the array R[1] to R[23]. The left isochromatic color temperature curve 43 is constructed of 23 approximate points composed of the approximate points $L_1$ to $L_{23}$. The coordinates of the approximate points $L_1$ to $L_{23}$ are stored in the array L[1] to L[23]. The approximate points $R_1$ to $R_{23}$ of the right isochromatic color temperature curve 42 and the approximate points $L_1$ to $L_{23}$ of the left isochromatic color temperature curve 43 are respectively determined based on the approximate points $K_1$ to $K_{23}$ of the blackbody radiation curve 41.

Note that the approximate point $K_{17}$ of the blackbody radiation curve 41 is positioned at an intersection where the B/G and R/G values have the same magnitude. The high color temperature region 22 in the xy chromaticity diagram in FIG. 4A corresponds to the vicinity of the approximate point $K_1$ of the blackbody radiation curve 41 and the low color temperature region 23 corresponds to the vicinity of the approximate point $K_{23}$ of the blackbody radiation curve 41.

The information stored in the array K[1] to K[23], the array R[1] to R[23], and the array L[1] to L[23] is written into a memory, not shown, provided inside the image pickup apparatus 10. In the processing of the program 18 carried out by the system controller 17, the values stored in the arrays are read out as needed by designating the subscript.

As a result, when the subscript is the same for respective arrays, points on an isochromatic temperature line are designated, and straight lines that connect such points form the isochromatic temperature line. The pull determining unit 174 moves the light source position to a convergence target point along an isochromatic temperature line, and calculates gain values from the displacement amount produced by such movement to adjust the white balance. In this way, it is possible to adjust the white balance for light from the light source while maintaining color temperatures that are visually isochromatic.

Also, so long as points are located between the right isochromatic color temperature curve 42 and the left isochromatic color temperature curve 43, such points can be said to be isochromatic, and when the light source position is located between the right isochromatic color temperature curve 42 and the left isochromatic color temperature curve 43, the pull is carried out and when the light source position is not located between the right isochromatic color temperature curve 42 and the left isochromatic color temperature curve 43, the pull is not carried out. Thus, it is avoided that a pull is carried out for the light source that is not isochromatic to result in the pulled color temperature looking unnatural.

The pull process carried out by the pull determining unit 174 will now be described with the present points $A_0$, $A_1$, $A_9$, $A_{23}$ as examples. As described above, the pull process carried out by the color signal processing circuit 1 is a process that a predetermined target value is set in a given color coordinate system and gain values of R, G, B color signals are set so that a light source position specified in such color coordinate system matches the target value. In the pull process carried out in the present embodiment, in the color coordinate system that has the R/G axis and the B/G axis as the coordinate axes, the target value (also referred to as the "target point") is set on the blackbody radiation curve 41 at an intersection between the blackbody radiation curve 41 and the isochromatic temperature lines of the blackbody radiation curve 41, the right isochromatic color temperature curve 42, and the left isochromatic color temperature curve 43. When the light source position in this color coordinate system is inside the range of the right isochromatic color temperature curve 42 and the left isochromatic color temperature curve 43, the light source position is pulled to a target point. The pull determining unit 174 calculates the gain values of the R, G, B color signals from the displacement amount between the light source position and the target point when such pull is carried out.

The present point $A_1$ is positioned on an isochromatic temperature line connecting the three points $L_1$, $K_1$, and $R_1$. Accordingly, the pull determining unit 174 carries out the pull process to pull the present point $A_1$ to the approximate point $K_1$ that is the convergence target point. The present point $A_{23}$ is positioned on an isochromatic temperature line connecting the three points $L_{23}$, $K_{23}$, and $R_{23}$. Accordingly, the pull determining unit 174 carries out the pull process to pull the present point $A_{23}$ to the approximate point $K_{23}$ that is the convergence target point. The present point $A_9$ is not positioned on an isochromatic temperature line of the three points $L_9$, $K_9$, and $R_9$ or on an isochromatic temperature line of the three points $L_{10}$, $K_{10}$ and $R_{10}$, but is positioned within the range of the right isochromatic color temperature curve 42 and the left isochromatic color temperature curve 43. In this case, the isochromatic temperature line at the shortest distance from the present point $A_9$ (in this example, the line set by $L_9$, $K_9$) is decided. Then, the pull determining unit 174 decides the convergence target point based on the selected isochromatic temperature line, and the pull determining unit 174 carries out the pull process to pull the present point $A_9$ to the convergence target point (in this example, the approximate point $K_9$).

On the other hand, the present point $A_0$ is not positioned within the range of the right isochromatic color temperature curve 42 and the left isochromatic color temperature curve 43. Accordingly, the pull determining unit 174 does not carry out the pull process on the present point $A_0$. In the present embodiment, a line connecting the three approximate points with the same subscript on the blackbody radiation curve 41, the right isochromatic color temperature curve 42, and the left isochromatic color temperature curve 43 is regarded as an isochromatic temperature line. The intersection between the blackbody radiation curve 41 and the isochromatic temperature line is decided as the convergence target point and the pull process is carried out. Note that the isochromatic temperature line is constructed by three approximate points and is not necessarily a straight line. For example, the isochromatic temperature line that joins the three points $L_{23}$, $K_{23}$, $R_{23}$ is a broken line with $K_{23}$ as the break point.

According to the present embodiment described above, the blackbody radiation curve 41 obtained by a matrix conversion of the blackbody radiation curve 31 defined on the uv axes in a uv chromaticity diagram to a color coordinate system expressed by the R/G and B/G axes and the isochromatic color temperature curves 42, 43 are used to carry out white balance processing. In the past, it was only possible to express the light source determining region using a blackbody radiation curve, which is a linear approximation with only a few approximate points, and equal deviation lines thereof. However, according to the present embodiment, based on the isochromatic color temperature curves defined on CIE1960uv axes, it is possible to determine the light source position and the convergence target point for the white balance based on a more accurate color temperature calculation. This results in the effect of improved precision for the convergence target point when carrying out white balance processing Also, in the present embodiment, inside the range of isochromatic color temperatures, points that are regarded as isochromatic are associated with points on the blackbody radiation curve 41 selected as break points of isochromatic temperature lines (i.e., convergence target points). Therefore, it is possible to cause the light source position to converge on the convergence target point on the blackbody radiation curve 41 while maintaining the isochromatic color temperature. This results in the effect that it is possible to express the color temperature more precisely and more correctly for each color temperature of the light source.

For example, when filming in the evening, human vision has a characteristic that although changes in color temperature are tolerated for changes in blue, even small changes in red are not tolerated. However, in the present embodiment, this characteristic of human vision is reflected in the process, so that not only the light source position is caused to converge on the convergence target point, but also the precision of estimating the environment where the light inputted from the light source is detected, or in other words, the color temperature (i.e., the light source position) obtained from the light of the light source that illuminates the subject can be simultaneously raised. This results in the effect that the precision of white balance processing is raised.

Note that although the blackbody radiation curve 41 is approximated using 23 approximate points in the present embodiment described above, the number of approximate points may be increased or decreased from 23. For example, the number of approximate points may be ten or fifty. As the number of approximate points increases, it is possible to raise the precision of the white balance, but the number of approximate points should be determined in accordance with the capability of the image pickup apparatus that carries out the processing.

In the embodiment described above, the blackbody radiation curve 41 and the isochromatic color temperature curves 42, 43 are expressed in the color coordinate system shown in FIG. 5 that has R/G as the horizontal axis and B/G as the vertical axis. However, it is also possible to express the blackbody radiation curve and the isochromatic color temperature curves on a coordinate system that uses other axes. For example, although the first calculation unit 171 and the second calculation unit 172 calculate the R/G and B/G values based on R, G, B color signals, it is also possible to calculate the G/R and B/R or R/B and G/B values. It is also possible to carry out calculation and pull determination based on signals aside from R, G, B color signals.

Also, in the above-described embodiment, although the target value used in the pull process was set as an intersection of the blackbody radiation curve 41 and the isochromatic temperature lines defined in the color coordinate system in FIG. 5, another point may be set as the target value. Also, as the method of carrying out the white balance processing, aside from a method that sets the gain values based on the R, G, B color signals outputted from the white balance amps used in the embodiment described above, it is possible to use a method that sets the gain values based on the R, G, B color signals before input into the white balance amps.

It should be understood by those skilled in the art that various modifications, combinations, sub-combinations and alterations may be possible depending on design requirements and other factors insofar as they are within the scope of the appended claims or the equivalents thereof.

What is claimed is:

1. A color signal processing circuit comprising:
a first calculating unit that generates a first divided value by dividing a first primary color signal of a plurality of primary color signals generated by an image pickup element irradiated with light from a light source via an optical system, by a second primary color signal of the plurality of primary color signals;
a second calculating unit that generates a second divided value by dividing a third primary signal of the plurality of primary color signals by the second primary signal;
a position specifying unit that specifies a position of the light source based on the first and second divided values, with a position that expresses a color temperature of light of the light source in a color coordinate system determined by a first coordinate axis expressed by dividing the first primary color signal by the second primary color signal and a second coordinate axis expressed by dividing the third primary color signal by the second primary color signal as the position of the light source; and
a pull determining unit that determines a displacement amount between the position of the light source specified by the position specifying unit and a position of a target point on a blackbody radiation curve defined in the color coordinate system, sets gain values for the first to third primary colors for adjusting a white balance based on the displacement amount, and supplies the gain values to primary color signal amplifying units that amplify the first to third primary color signals,
wherein the pull determining unit determines, in the color coordinate system, whether the position of the light source is positioned on a predetermined isochromatic temperature line that pass through the target point, and
wherein if the position of the light source is determined to be not positioned on the predetermined isochromatic temperature line, the pull determining unit determines a closest isochromatic temperature line that is at the shortest distance from the position of the light source and determines a convergence point based on the closest isochromatic temperature line.

2. A color signal processing circuit according to claim 1, wherein
the pull determining unit determines the blackbody radiation curve and isochromatic color temperature curves that have predetermined deviation widths from the blackbody radiation curve, sets the target point on the blackbody radiation curve as determined by an intersection of the blackbody radiation curve and isochromatic temperature lines for the isochromatic color temperature curves and the blackbody radiation curve, and determines the displacement amount between the position of the light source and the position of the target point when the position of the light source in the color coordinate system is within ranges of the deviation widths of the isochromatic color temperature curves from the blackbody radiation curve.

3. An image pickup apparatus comprising:
an image pickup element generating a plurality of primary color signals; and
a color signal processing circuit adjusting respective gains of the plurality of primary color signals, the color signal processing circuit including, a first calculating unit that generates a first divided value by dividing a first primary color signal of a plurality of primary color signals generated by an image pickup element irradiated with light from a light source via an optical system, by a second primary color signal of the plurality of primary color signals;

a second calculating unit that generates a second divided value by dividing a third primary signal of the plurality of primary color signals by the second primary signal;

a position specifying unit that specifies a position of the light source based on the first and second divided values, with a position that expresses a color temperature of light of the light source in a color coordinate system determined by a first coordinate axis expressed by dividing the first primary color signal by the second primary color signal and a second coordinate axis expressed by dividing the third primary color signal by the second primary color signal as the position of the light source; and a pull determining unit that determines a displacement amount between the position of the light source specified by the position specifying unit and a position of a target point on a blackbody radiation curve defined in the color coordinate system, sets gain values for the first to third primary colors for adjusting a white balance based on the displacement, and supplies the gain values to a primary color signal amplifying unit that amplifies the first to third primary color signals, wherein the pull determining unit determines, in the color coordinate system, whether the position of the light source is positioned on a predetermined isochromatic temperature line that pass through the target point, and wherein if the position of the light source is determined to be not positioned on the predetermined isochromatic temperature line, the pull determining unit determines a closest isochromatic temperature line that is at the shortest distance from the position of the light source and determines a convergence point based on the closest isochromatic temperature line.

4. A color signal processing method comprising:

generating a first divided value by dividing a first primary color signal of a plurality of primary color signals generated by an image pickup element irradiated with light from a light source via an optical system, by a second primary color signal of the plurality of primary color signals;

generating a second divided value by dividing a third primary signal of the plurality of primary color signals by the second primary signal;

specifying a position of the light source based on the first and second divided values, with a position that expresses a color temperature of light of the light source in a color coordinate system determined by a first coordinate axis expressed by dividing the first primary color signal by the second primary color signal and a second coordinate axis expressed by dividing the third primary color signal by the second primary color signal as the position of the light source; and determining a displacement amount between the position of the light source and a position of a target point on a blackbody radiation curve defined in the color coordinate system, setting gain values for the first to third primary colors for achieving a white balance based on the displacement amount, and supplying the gain values to primary color signal amplifying units that amplify the first to third primary color signals, wherein the determining step determines, in the color coordinate system, whether the position of the light source is positioned on a predetermined isochromatic temperature line that pass through the target point, and wherein if the position of the light source is determined to be not positioned on the predetermined isochromatic temperature line, the determining step determines a closest isochromatic temperature line that is at the shortest distance from the position of the light source and determines a convergence point based on the closest isochromatic temperature line.

* * * * *